Aug. 24, 1937.  W. C. VIZARD  2,090,715
WELTING AND THE MANUFACTURE THEREOF
Filed May 9, 1936
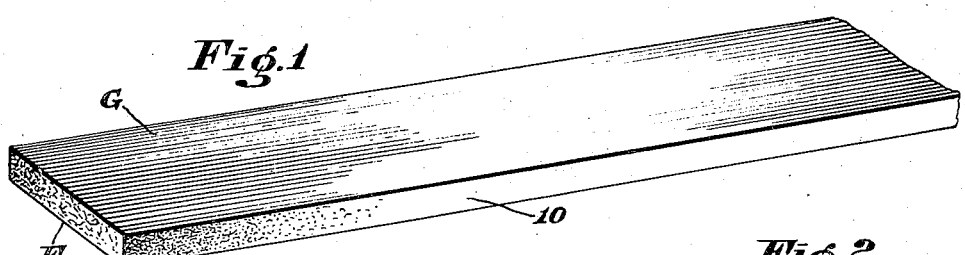
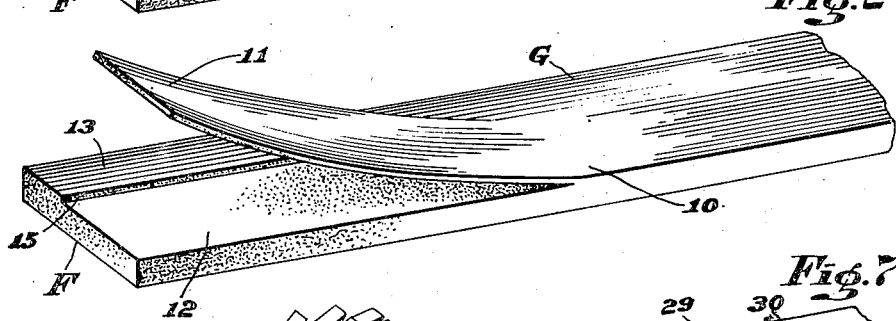
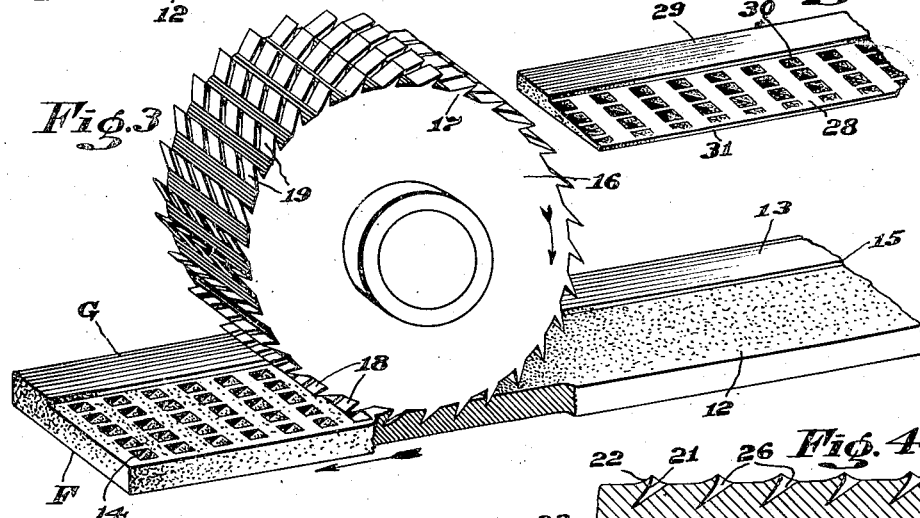
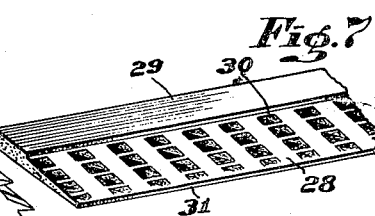
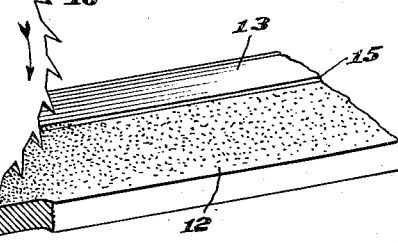
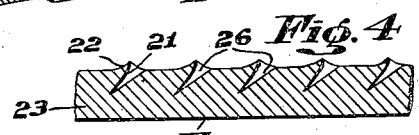
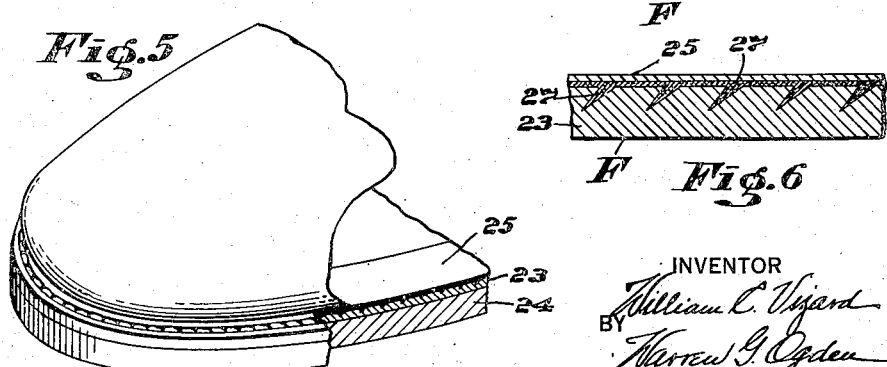
INVENTOR
William C. Vizard
BY Warren G. Ogden
ATTORNEY Patented Aug. 24, 1937

2,090,715

UNITED STATES PATENT OFFICE 2,090,715

WELTING AND THE MANUFACTURE THEREOF

William C. Vizard, Brockton, Mass., assignor to Barbour Welting Company, Brockton, Mass., a co-partnership composed of Perley E. Barbour, Walter G. Barbour, and Richard H. Barbour Application May 9, 1936, Serial No. 78,839

6 Claims. (Cl. 12—146)

This invention relates to improvements in the manufacture of boots and shoes and more especially to improvements in welted cement processed shoes.

Various expedients have been proposed to strengthen the cement bond; for example, it is a common practice to roughen the surface of welting which is to engage the outsole by a rotating wire brush or an abrasive wheel, which, in theory, picks up or loosens the fibres of the welting thus providing for greater penetration of the cement with a corresponding increase of bonding strength. This has proved satisfactory where the welt is first attached to the upper, exposing its flesh face to the roughening tool, but this method is not effective where the welt is first attached to the outsole, exposing its grain face for bonding to the inlasted upper.

A considerable number of both men's and women's welted, cement processed shoes are now made by attaching the welt to the outsole and then securing the welted outsole to the lasted upper. For men's shoes the welt is of the normal size for Goodyear work but only the grain on its outer margin is required for the exposed extension; likewise in the smaller women's welts only a portion of the grain is required for the exposed extension.

The principal object of this invention is to prepare the grain face of leather welting in such a way that an efficient and secure cement bond may be obtained between the welt and the upper of the shoe while preserving sufficient grain for the exposed extension. Accordingly a feature of the invention resides in removing a grain ribbon inside of the grain extension thus exposing a shelf of flesh stock adapted to receive a treatment for insuring an enduring bond with the upper. The novel treatment of this grain-side flesh shelf, providing specially shaped cement pockets, forms another feature of the invention.

A further special object of the invention is to provide a form of welting adapted especially for that type of cement processed shoe wherein a welted outsole is applied to the upper.

To the accomplishment of these objects and such others as may hereinafter appear, as will readily be understood by those skilled in the art, the invention comprises the novel welting, the process of its manufacture and shoe-making therewith as hereinafter described and then particularly pointed out in the appended claims.

An understanding of the novel features of the invention will best be understood by inspection of the accompanying drawing in which:

Figure 1 is a view, in perspective, of a portion of a grain leather welt strip;

Fig. 2 is a view, in perspective, illustrating the operation of removing a ribbon of grain from the welt strip to expose flesh on the grain side thereof;

Fig. 3 is a view, in perspective, illustrating the step of forming cement receiving pockets in the flesh shelf exposed by removal of the grain of the welt strip;

Fig. 4 is a longitudinal sectional view, greatly enlarged, of a portion of the welt strip after the operation shown in Fig. 3;

Fig. 5 is a view, in perspective, showing a portion of a man's shoe having the improved welting embodied therein;

Fig. 6 is a longitudinal sectional view, greatly enlarged, of a portion of the welt and upper of a shoe as illustrated by Fig. 5, and Fig. 7 is a view, in perspective, of a portion of a woman's welt prepared in accordance with the teaching of this invention.

In the illustrated embodiment of the invention, referring first to the men's welt shown in Figs. 1-6 of the drawing, the process of manufacture may start with a blank or strip 10 (Fig. 1) of welting leather having a grain face G, and a flesh face F, the size of the strip being varied to meet the individual welting needs of the shoe manufacturer.

The strip 10 is first run past a knife or knives so shaped or arranged as to cut a ribbon 11 from the grain face G leaving an exposed flesh shelf 12 and an adjoining margin of grain 13, the latter forming the welt extension in the finished shoe. In practice the relative widths of the flesh shelf and grain extension may be varied, for example, in a $\frac{9}{16}''$ welting for men's shoes the width of the grain extension preferably is $\frac{5}{32}''$, whereas in a $\frac{3}{8}''$ welting for women's shoes the grain extension may be the same as on the wider men's welting. In any case the ribbon 11 is merely of such thickness as to remove the grain of the leather and to leave exposed a shelf of flesh stock inside of the grain extension to which the shoe upper may be cemented. It will be understood that suitable guiding means will be provided for the strip 10 during the removal of the ribbon 11 so that the grain extension 13 will be of uniform width and the ribbon 11 will be of uniform thickness.

After the grain ribbon 11 has been removed that portion of the welt strip defined by the flesh shelf 12 is operated on to form therein a series of spaced cement receiving pockets 14 each of which opens upwardly through the flesh of the shelf 12. These relatively narrow but deep pockets 14 are inclined at an acute angle to the plane of the shelf 12 and conveniently are uniformly spaced across and along the welting between the shoulder 15 at the inner edge of the extension and the inner marginal edge of the welting. Preferably the pockets 14 are formed by guiding the welt strip beneath a power driven indenting roll 16 having peripheral teeth 17 which cut or press into the strip. The teeth 17 in this instance are chisel pointed and arranged in axially aligned rows evenly spaced about the periphery of the roll.

In order that the pockets 14 formed by the teeth 17 will be inclined at an angle to the surface 12 of the welting the leading faces 18 and the trailing faces 19 of the teeth 17 are tangentially directed and inclined forwardly in the direction of rotation of the roll. The feeding of the strip may be accomplished by the teeth of the roll and it will be readily understood by one skilled in the art that in practice suitable guiding and supporting means will be provided so that the teeth of the roll may engage the strip only on its exposed flesh surface on the grain side and will penetrate only to the desired depth. The direction of rotation of roll 16 and the direction of movement of the strip 10 are indicated by the arrows on Fig. 3.

Due to the angularity of the teeth 17 the latter first engage the welt strip in a direction substantially at right angles to the flesh shelf 12, however, as the strip passes into the bite of the roll and the teeth enter the strip the angular relation of the teeth to the plane of the shelf 12 changes until, when the teeth have penetrated to their full depth, they lie at an acute angle to said plane. The relative angle of the teeth becomes more acute as the welting, maintained as a straight strip, leaves the roll bite so that as the teeth separate from the strip they are very nearly parallel to the plane of the shelf they have penetrated. This progressive change in the angular relation of the teeth 17 to the welting is shown by Fig. 3. Obviously the welting must be stripped from the angular teeth, otherwise their grip thereon will cause it to wind up on the roll. Manufacturers of welting in strands of unlimited length will understand that the next machine of the series will hold the welting as a straight strip down on the bed over which it travels beneath the successive operating tools of the series of machines for preparing it for application to an outsole.

As a result of the change of angular relation of the teeth with respect to the welt strip, as the welt strip passes forward without change of direction when emerging from the roll bite, teeth of the roll are required to tear upwardly through the flesh, to a certain extent, of the forward or overhanging upper walls 21 of the pockets 14. This not only opens out the mouths of the pockets but tends to form rough lips 22 (Fig. 4) which may curve upwardly from the forward edges of the pockets. The welt strip, after leaving the roll 16, is accordingly provided with pockets 14 spaced across and along the flesh shelf 12, each pocket being inclined as a whole in a direction longitudinally of the welting relatively to the plane of said shelf and having an enlarged mouth and generally a loose fibred forward edge.

After the welting has been prepared in the manner described the usual shoemaking processes need not be altered in its use in the manufacture of mock-welt cement processed shoes. In the manufacture of such a shoe (Fig. 5) a piece of welting 23 prepared in the above manner and of the required length is stitched and, if desired, cemented to the margin of an outsole 24. The outsole with the welt applied thereto is then passed through a cement applying machine the snout of which drags over the pocketed face 12 coating the latter and filling its pockets with cement. Preferably the relative direction of movement of the welt past the snout of the cement applying machine is such that the open upper ends of the pockets are directed forward, that is to say, the relative direction of movement will be the opposite of that in Fig. 3. Thus, as the snout of the usual cement applying machine is inclined at an angle to the surface on which the cement is received, the longitudinally inclined pockets passing beneath the snout will be in substantial angular alignment with the outflowing cement so that they each will receive a full charge. After the pockets have been filled with cement and the flesh exposed by the removal of the grain ribbon has been coated, the outsole is set aside so that the cement may harden.

The inlasted portion of the upper 25 of a lasted shoe is roughened and cement is applied thereto which is likewise permitted to harden. A softener or thinner is now applied to the cement coated surfaces of the welt and upper, the softener or thinner cutting the cement to a certain extent and softening the surfaces of both welt and upper, whereupon the outsole is applied to the lasted shoe and the previously cement surfaces brought together under pressure which is maintained until the cement has again hardened.

It will be noted that as the welt 23 is pressed against the upper 25 the rough or torn lips formed at the forward edges of the pockets 26 are pressed down or flattened so that the fibres of the welt between and around the pockets is in intimate cement-bonded contact with the upper. Each pocket 26 contains a downwardly extending finger 27 (Fig. 6) of cement which is inclined at an angle to the bonding layer and is firmly embedded in the welt serving the same purpose as the fluke of an anchor. As a result, the welt cannot be separated from the upper without tearing these fingers out of their pockets, together with the roughened welt stock thoroughly intermingled therewith. The inclined pockets in the welt secure not only this anchoring effect from the cement fingers but also secure an increased cemented area of the stock beyond that which is possible with any brushing or abrading method. Moreover, the pockets being formed right up to the shoulder 15 at the inner edge of the welt extension, the cemented bond is strengthened throughout the region where it is subjected to the greatest strain.

The strip of women's welting shown in Fig. 7 is skived to a bevel in forming the flesh shelf 28 and grain extension 29. This strip is operated on in the same manner as that shown in Fig. 3 to form a series of cement pockets 30. In this instance the pockets 30 adjacent the extension 29 will be somewhat deeper than those adjacent the inner marginal edge 31. However, as heretofore stated, the greatest strain is thrown on that portion of the cemented bond adjacent the shoulder 29 and as the pockets are of full depth at this point the same advantages are obtained for women's welting as are obtained for men's welting.

The depth of the pockets will vary in accordance with the thickness of the welting but in all cases the lower ends of the pockets will be kept a sufficient distance above the flesh face F of the welting as to prevent the roll teeth from passing completely through the welting.

Thus welting for use in mock-welt cement processed shoes is treated so as to provide for a deeper and more effective penetration of the cement and this result is obtained without undesirable weakening or destruction of the fibrous structure of the welting. This is accomplished by the use of the specially formed cement receiving pockets or indentations and in the method of making the same wherein an interlocking or anchoring engagement of the cement within the welting is brought about. The firmness of the bond between the welting and an upper is such that the cemented shoe parts cannot be separated except by a force which will cause the fibres of the upper or the welt to disintegrate.

While certain preferred embodiments of the invention have been illustrated and described, it will be understood that the same is not to be limited to these details but is capable of modification and variation within the spirit of the invention and scope of the appended claims.

What is claimed as new, is:

1. Shoe welting of grain leather for welted cement processed shoes, said welting having a flesh shelf at the grain side to which an upper may be cemented and an adjacent grain extension, said flesh shelf being provided with a plurality of cement receiving pockets, each of said pockets being inclined as a whole in a direction longitudinally of the welting relatively to the surface of said flesh shelf to facilitate filling with cement.

2. Shoe welting according to claim 1 in which each cement receiving pocket has the upper edge of its overhanging wall raised above the face of said flesh shelf to open out the mouths of the pockets for the reception of cement.

3. Welting for shoes having a plurality of cement receiving pockets formed in a flesh face thereof for strengthening a cement bond between said welt and the abutting portion of the shoe, each of said pockets being inclined as a whole in a direction longitudinally of the welting relatively to the surface of said flesh face, whereby a filling of the said pockets with cement is facilitated.

4. The method of making shoe welting which comprises removing a ribbon of grain from a strand of grain leather to expose a flesh surface on its grain side, repeatedly forcing a sharp tool into said exposed flesh at an inclination to its surface to form oblique cement receiving pockets in said flesh surface, and then withdrawing the tool from the pockets in a direction to force back the overhanging upper walls of the pockets and enlarge the capacity of their mouths for receiving cement.

5. The method of making shoe welting which comprises exposing a flesh shelf at the grain side of a strand of grain leather by removing a grain ribbon of less width than the width of the strand, advancing the strand in a fixed plane while repeatedly stabbing said exposed flesh with a tool having a path of movement inclined to the plane of travel of the strand to form oblique cement receiving pockets therein, then while the strand continues to advance dragging said tool upward out of the pocket past its overhanging wall to raise a rough lip at the upper edge thereof.

6. The method of making shoe welting which comprises exposing a flesh shelf at the grain side of a strand of grain leather by removing a grain ribbon of less width than the width of the strand, forming a plurality of cement receiving pockets in said grain side flesh shelf each inclined to the plane of its surface, and lacerating the fibres at one side at least of the open mouths of said pockets.

WILLIAM C. VIZARD.